United States Patent [19]

Stenstrom

[11] 3,809,845

[45] May 7, 1974

[54] HEATING OF PRODUCTS IN ELECTRO-MAGNETIC FIELD

[75] Inventor: Lennart Arvid Stenstrom, Huddinge, Sweden

[73] Assignee: Alfa-Laval AB, Tumba, Sweden

[22] Filed: Sept. 1, 1971

[21] Appl. No.: 176,968

[30] Foreign Application Priority Data
Sept. 8, 1970  Sweden............................ 12155/70

[52] U.S. Cl.................. 219/10.55, 21/54 R, 99/451
[51] Int. Cl. ........................................... H05b 9/06
[58] Field of Search.................. 219/10.55; 21/54 R; 99/217, 451

[56] References Cited
UNITED STATES PATENTS

| | | | |
|---|---|---|---|
| 3,470,942 | 10/1969 | Fukada et al................ | 219/10.55 X |
| 3,335,253 | 8/1967 | Jeppson et al................... | 219/10.55 |
| 3,256,101 | 6/1966 | Arns............................ | 219/10.55 X |

Primary Examiner—J. V. Truhe
Assistant Examiner—Hugh D. Jaeger
Attorney, Agent, or Firm—Cyrus S. Hapgood

[57] ABSTRACT

Each product unit, enclosed in a casing which is transparent to electro-magnetic energy, is heated by passing it through an electro-magnetic field of at least microwave frequency while closely surrounding the unit (at least along its boundaries as seen in a plane perpendicular to the main direction of applying the field against the unit) with a fluid medium having a dielectric constant which is at least one-half the dielectric constant of the product unit in the field. The electromagnetic heating of each unit is terminated when its interior reaches a predetermined temperature; and the temperature of the surrounding medium is controlled to provide the product unit near its surface with a temperature which, upon such termination, is substantially said predetermined temperature.

15 Claims, 5 Drawing Figures

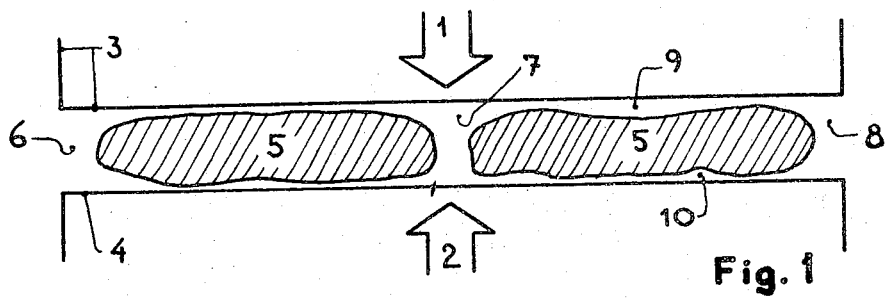
Fig. 1
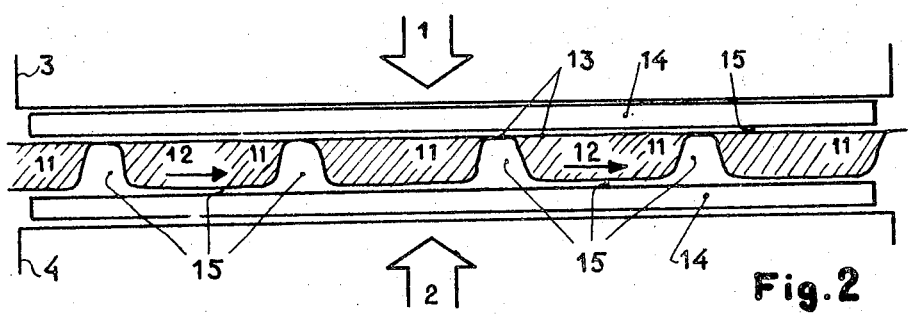
Fig. 2
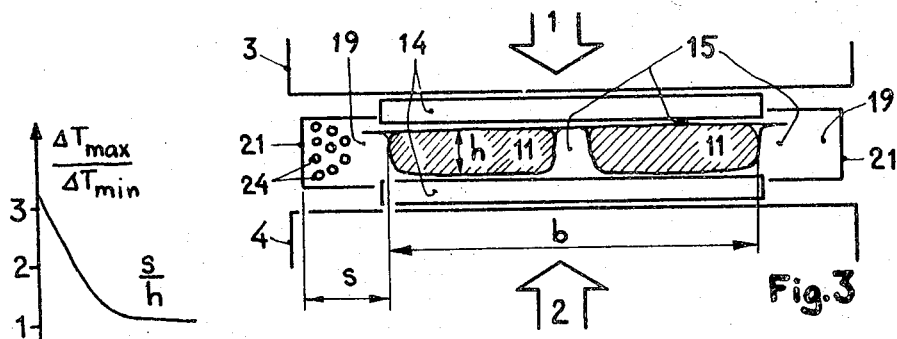
Fig. 3
Fig. 5
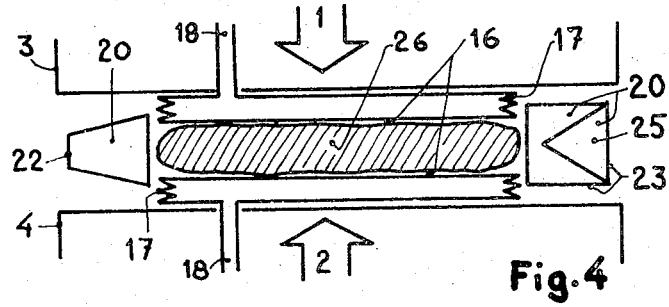
Fig. 4
INVENTOR.
LENNART ARVID STENSTR...
BY
Davis, Hoxie, Faithfull + Haygood
ATTORNEYS

HEATING OF PRODUCTS IN ELECTRO-MAGNETIC FIELD

This invention relates to the heating of heat-sensitive products in an electro-magnetic field, such as a microwave field, and relates particularly to an improved method for this purpose.

Heat sterilization of a nutritive product means in practice that the product is subjected to a heat treatment such that the spores of the poison-producing bacteria Clostridium botulinum cannot survive. However, a heat treatment of such products in this manner normally leads to an impaired taste of the products, due to complex chemical reactions.

While the sterilization effect of a heat treatment depends substantially upon the temperature during the heat treatment, the chemical effects (many of which are developed to a harmful extent when a critical temperature range typical for the product is obtained) depend to a higher degree than the sterilization effect upon the length of time during which the heat treatment is effected. Therefore, it is desirable in connection with heat sterilization or pasteurization of foodstuffs to use so called HTST-processes, i.e., heat treatment at high temperature for a short time. (HTST is short for High Temperature Short Time.)

HTST-processes have long been available for treating fluid and semi-fluid products. For these products, a rapid and effective heat transfer in a conventional manner, together with a subsequent aseptic filling into packages, have been rather easily performed. For solid products, however, HTST-processes have not been carried out satisfactorily so far.

It was understood for many years that electro-magnetic energy, due to its special capability of heating the inner parts of a product, should enable a heat treatment of solid food-stuffs substantially in the manner of the HTST-processes as to rapidity and intensity. However, in spite of intensive development work in the field, no satisfactory method has been developed heretofore. Several test runs have been made for heating solid product units to sterilizing or pasteurizing temperature in an electromagnetic field, and although it was eventually possible to obtain a substantially uniform field strength across a considerable area of a field, it was recognized that product units treated in the field are still unevenly heated. It was found that the edge portions of the product units, as viewed in the main direction of the application of the electro-magnetic field against the product units in a practical frequency range for economic heating, obtained quite a different temperature than other portions of the product units. Further, it has proved that the effect of the electro-magnetic field was damped gradually when penetrating into a product unit, so that product units treated in the field were less heated in their central parts than at their surfaces. This has made a sufficient heat treatment effect in a product unit unachievable, when attempting to sterilize or pasteurize it, unless certain portions of the product unit were so strongly heated that they were spoiled in one respect or another.

In order to solve these problems, it has been attempted to provide means for applying an electro-magnetic field such that an even energy conversion is obtained in product units inserted in the field. So far, this has not given the desired result, however. It has also been attempted to pre-heat product units in a conventional manner prior to heating them in an electro-magnetic field. This has led to an effect contrary to the desired one, however, probably because conventional heating (to an even higher degree than heating in an electro-magnetic field) leads to a greater temperature rise in the edges and surface of the product unit than in the inner parts of it.

The present invention is aimed at solving the above-mentioned problems and relates to a method in connection with electro-magnetic heating of separate units of a product to a predetermined temperature, each product unit being first enclosed in a casing transparent to electro-magnetic waves, and then heated in an electro-magnetic field of at least microwave frequency. The invention comprises closely surrounding the product unit in the electro-magnetic field (at least along the boundaries of the product unit as seen in a plane perpendicular to the direction of the main application of the field against the product unit) by a medium having a dielectric constant which is at least half of that of the product unit in the field, and controlling the temperature of this medium so that when the electro-magnetic heating is terminated the temperature close to the surface of the product unit is substantially the said predetermined temperature, which has been obtained in the interior of the product unit upon such termination.

By this method, an environment is created around the product unit, which has the effect that the edges and surfaces of the product unit appear in the electro-magnetic field as if they were a part of the interior of another product unit, i.e., the interior of a new product unit consisting of the real product unit and the medium surrounding it. According to the invention, the temperature in the surface and edges of the new product unit, i.e. the temperature in the medium surrounding the real product unit, is controlled so that this temperature, when the electro-magnetic heating is ended, substantially equals the value desired at this moment at the surface layer of the real product unit.

This desired temperature is chosen in consideration of the distribution of the electro-magnetic field in the real product unit. In other words, the temperature that will arise in the interior of the real product is considered. By controlling, in relation to the intended temperature of the interior of the product unit, the temperature of the medium surrounding the product unit (which medium influences the surface layer of the product unit by heat convection and conduction), it is possible to keep the temperature in the surface layer of the product unit at a value such that a very even temperature is obtained in the whole of the product unit.

According to a preferred embodiment of the invention, used when the product unit to be heated is moved through a zone wherein the electro-magnetic field is applied, the said medium is fluid and of a kind that absorbs electro-magnetic energy. The fluid medium entering the field is preferably given a temperature such that where the product unit leaves the field, the medium has been heated by the field to substantially the temperature which is predetermined for the interior of the product unit in this part of the zone.

A liquid medium is preferably used when the electro-magnetic heating is to be performed very rapidly, e.g., during a shorter time than 20 seconds, since a liquid medium is the easiest one to control effectively as to temperature. Further, a liquid medium also contributes in other ways in equalizing the temperature in the heat-treated product unit. That is, it contributes very effectively by convection and it also prevents irregularities of the shape of the product unit from deviating or otherwise influencing the electro-magnetic field so that it heats the product unit unevenly.

In practice, the temperature control of the medium surrounding the product unit in the field may be performed in different ways. As previously mentioned in connection with a fluid medium, it can be given a certain temperature when it enters the field so that, when the electro-magnetic heating is ended, it has obtained the desired temperature. It is also possible, however, to indirectly cool a medium surrounding the product units in the field for obtaining the desired temperature.

In cases where the product unit is surrounded in the electro-magnetic field by a fluid medium which absorbs electro-magnetic energy, the height of said zone (i.e., the distance between the boundary walls of the zone as reckoned in the main direction of application of the electro-magnetic field against the passing product units) is preferably adjusted so that it exceeds only slightly the height of the product units.

As previously mentioned, product units passing through a microwave field become more heated in their edges than in other parts. This is partly because the product units attract field lines from parts of the microwave field beside the product path. If this effect is to be avoided, the zone wherein the field is applied must be filled on each side of the passing product units to a width equal to at least the height of the product units, by a medium having a dielectric constant which is at least half of that of the product units in the microwave field. If a medium is used which absorbs microwaves to a substantial degree, the zone on each side of the passing product units should be filled by this medium to a width not exceeding three times the height of the product units. A further filling of the zone by a medium of this kind gives no better effect in the above-mentioned respect.

In some instances, where a certain relationship is required between the dielectric constants of the product units and the surrounding medium, it may be necessary to use a fluid medium which absorbs substantial amounts of electro-magnetic field energy, such as an emulsion, a salt solution or a starch solution. In such instances, this absorption and the resulting loss can be reduced by introducing into the fluid medium solid bodies which absorb microwaves only to a small extent. If the fluid medium does not have quite the desired dielectric constant in relation to that of the product units, this expedient has the further advantage that by suitable choice of the proportion of the solid bodies and their dielectric constant, the medium may be provided with the desired dielectric properties.

Because the medium surrounding the product units can be varied in form and composition, it is a simple matter to compensate for the non-uniformity of the electro-magnetic field, which cannot be avoided near the boundary of the field. Depending upon the type of means used for applying the field, the form and composition of the medium is preferably determined from case to case by experiment.

For different reasons, temperature peaks may arise sporadically in the product unit. These peaks can result from non-homogeneity of the product. They can also occur because the absorption of microwaves by the product unit increases with the temperature, so that portions of the product unit which have reached a certain high temperature tend to acquire a further temperature rise. If nothing is done, this can go on accelerated. By the above-described method, these problems normally can be avoided. In exceptional cases, as when requirements of extremely rapid heating in connection with this phenomenon lead to temperature peaks, further steps may be desirable for achieving a temperature equalization.

According to the invention, the fluid medium by which the product units are surrounded in the previously mentioned zone may have a composition such that its dielectric constant for the field decreases with increasing temperature. The effect of this is that temperature peaks arising in the surface layer of the product unit (which surface layer may consist partly of a thin packing material sensitive to overheating) will cause extra heating of the fluid medium situated adjacent to these temperature peaks. Then, according to the invention, the dielectric constant of this part of the fluid medium decreases. As a result, the temperature-increasing part of an available potential difference between two points in the field (between which points medium as well as product are present) will be taken up by the medium, so that the remaining part of said difference (decreasing with the temperature) will be a factor determining the continued heating of the product unit. A certain automatic temperature control along the upper and lower surfaces of the product units in thus obtained, depending upon how the dielectric constant of the medium varies with the temperature. At the microwave frequency 2450 Mc/second, ordinary water, for instance, is a medium having a dielectric constant which varies with the temperature in the desired direction.

The invention is further described in the following with reference to the accompanying drawing, in which FIGS. 1–4 are schematic views of different embodiments of means for performing the method of the invention, and FIG. 5 is a diagram showing the relationship between the temperature rise in different parts of a product unit heated in an electro-magnetic field, and the sidewise extension of a surrounding medium in relation to the height of the treated product unit.

In FIGS. 1–4, two arrows 1 and 2 show the main direction for applying the electro-magnetic field, by respective field-applying means 3 and 4, against a product unit 5 surrounded by a medium 6–10. If the product unit is regarded in the direction shown by the arrow 1 or the arrow 2, it is seen as surrounded by certain parts 6, 7 and 8 of said medium. The product unit, regarded in other directions perpendicular to the arrow, also can be seen as surrounded by other parts 9 and 10 of said medium. The last mentioned parts in certain cases may be omitted, as when the product unit is pressed between the surfaces of the applying means 3 and 4, which surfaces are then preferably covered by an isolating material.

The construction of the field-applying means 3 and 4 is not further disclosed, as it may be conventional and may vary depending upon the selected frequency. If microwaves are used, they may be applied by well known means of different manufacture having a form in which the side facing the product unit has a contour as shown for the field-applying means 3 and 4. In certain cases, it will suffice to use only one of these applying means, such as the means 3, the other one then preferably being replaced by a metallic mirror.

The temperature of the medium 6–10 (FIG. 1) is controlled so that when the electro-magnetic heating is ended, it amounts to substantially the temperature that is desired at this time in the surface layer of the product unit. This control can be obtained, for instance, by supplying the medium around the product units, immediately before the latter are heated by the electro-magnetic field, at a temperature adapted to the calculated temperature change of the medium if the field, and to the desired end temperature of the surface layer of the product unit. Alternatively, after the medium has been brought into surrounding relation to the product unit, the medium may be cooled or heated (before or in connection with the electro-magnetic heating of the product unit) by means of cooling or heating coils (not shown) which may be built into the field-applying means 3 and 4.

If the heating of the product unit constitutes part of a continuous production, it is advantageous to provide means for feeding the products to be heated continuously through a zone wherein the electro-magnetic field is applied. Such means are shown in a longitudinal section in FIG. 2, and in cross-section in FIG. 3, modified means being shown in cross-section in FIG. 4. Through the zone containing the electro-magnetic field applied by the means 3 and 4, product units 11 are fed in the direction shown in FIG. 2 by the arrow 12. The product units 11 are enclosed in packing material 13 which also interconnects the different product units 11. The row of packages may be transported by means of the packaging material or by separate transport means. The zone preferably is confined by one or more sheet-formed members 14. The temperature of a medium 15 surrounding the product units is controlled so that when the electro-magnetic heating of the product units is ended (i.e., when the product units 11 leave the field provided by the applying means 3 and 4), the said temperature substantially corresponds to the temperature which at this stage (i.e., at the right-hand part of FIG. 2) is intended to be present in the surface layer of the product units. For performing this control, medium 15 may be continuously supplied to the zone at a certain temperature previously obtained by conventional means. This temperature may be such that the desired temperature is obtained at the point where the product units 11 leave the electro-magnetic field. Alternatively, the medium may be brought to another temperature before it is supplied to the zone, this temperature then being adjusted in the zone by means of cooling or heating coils, which may be built into the members 14 or into the applying means 3 and 4. Thermostat means, the sensing means of which preferably is situated in the medium 15 to the right in FIG. 2, may control this temperature adjustment.

In order that the medium surrounding the product units will not focus, deflect or otherwise distort the field heating the product units, a medium is chosen which has a dielectric constant not substantially different from that of the product units. Some aqueous products, however, have such a high dielectric constant that the medium preferably is also made aqueous in order to have a sufficient dielectric constant. Since such a medium will absorb a substantial amount of the electro-magnetic energy, it is advantageous to supply the medium 15 into the zone at a temperature lower than the one desired in the surface layer of the product units, where the latter leave the field. The medium is then heated in the field so that where the product unit leaves the field, it has a temperature substantially equal to the desired temperature.

The electro-magnetic energy absorbed by the medium may be saved in the form of heat energy, as for preheating the product units. In spite of this, it may be desired that such a consumption of electro-magnetic energy be limited, which may be accomplished by limiting the volume of the medium surrounding the product units. Also, it is preferred that one and the same apparatus be used to heat product units of different heights. The sheet-formed members 14 (consisting of material which only slightly absorbs microwaves) may be made exchangeable and with different heights, thereby making it possible to adjust the height of the zone, that is, the distance between the boundary walls of the zone reckoned in the main direction (arrows 1 and 2) for applying the electro-magnetic field against the product units. This zone height, at least across the whole width $b$ (FIG. 3) of the product units, may be adjusted so that it only slightly exceeds the height $h$ of the product units. Examples of materials suitable for the sheet-formed members 14 are plastics, such as polypropylene or polytetrafluoroethylene.

Together with or instead of the sheet-formed members 14, the same function can be achieved by means of a rigid or semi-rigid membrane 16 (FIG. 4) which, in cooperation with bellows 17, may be adjusted as to its position in height by supplying a medium in proper amount through an opening 18 to the side of the membrane facing away from the passing product units, this medium being a fluid which only slightly absorbs the electro-magnetic field. This embodiment is suitable for continuous adjustment and it also makes it easy to provide an automatic adjustment to accommodate occasional variations in the height $h$ of the product units. The simplest way of obtaining an automatic adjustment of this kind is to let the membrane barely touch the product units, as by keeping the medium supplied through the openings 18 at only a very small overpressure. Also, servo-technique control utilizing means for sensing the height $h$ of the product unit, and means for supplying a suitable amount of medium through the openings 18, may be used, good accuracy then being obtainable without the need of touching the surfaces of the product units.

When the dielectric constant of the product unit differs substantially from that of air, it is advantageous for obtaining an even heating effect if a space 19 (FIG. 3) or 20 (FIG. 4), located on each side of the passing product unit in the zone for applying the field, is filled with a medium having a dielectric constant which is at least half of that of the product unit for the field. Test runs have proved that the width S (FIG. 3) of this space critically determines the relation between a maximum temperature rise $\Delta T_{max}$ and a minimum temperature rise $\Delta T_{min}$ within the product unit in the electro-magnetic field. $\Delta T_{max}$ was measured near a corner of a sheet-formed product unit, and $\Delta T_{min}$ in the center of it. This temperature relation was determined experimentally under variations of the width S in relation to the thickness $h$ of the product unit in FIG. 3. As can be seen from the diagram in FIG. 5, it is advantageous for an even heating to have the width S amounting to at least the thickness h of the product unit, and at the most three times the thickness h of the product unit. The further gain as to heating evenness that might be obtained by making S more than three h is of a doubtful value, as every increase of S requires a larger input of electro-magnetic energy. The spaces 19 and 20, therefore, preferably are restricted by means 21 and 22 or 23, respectively, all of which have a width S fulfilling the requirement $h \leq S \leq 3h$.

Sometimes it may be difficult to obtain a fluid medium, such as a liquid, salt solution, emulsion, etc., having a dielectric constant which lies acceptably near that of the product unit. In such cases, the property of the medium is preferably modified by including solid bodies 24 or 25 as parts of it, either in a great number (FIG. 3) or in a small number (FIG. 4). The dielectric constant and the total volume of the solid bodies substantially determine how the solid bodies will influence the capability of the medium to contribute in obtaining evenness in the heating of the product unit. If the electro-magnetic field decreases in strength near the edges of the effective surface of the applying means 3 and 4 (as is often the case), it is possible to obtain a further evenness by providing the means 22 with an outward taper. Alternatively or in addition, it is possible to have the solid bodies 24 or 25 more concentrated at some distance from the product unit than close to it. In the case where a fluid medium is used in the spaces 19 and 20 at each side of the product units, this medium is preferably the same as that supplied to the zone and filling the space between a product unit 26 and the boundaries 16 of the zone. This makes it unnecessary to provide walls which seal the two media from each other.

Described in the following is a typical temperature program which has been used in connection with sterilization of products by means of microwaves. In one case, the product consisted of portions of minced meat which had been vacuum packed in thin material transparent to microwaves. The intention was to treat the portions so that as a whole they would rapidly obtain an even temperature of more than 130° C. The size of the portions was 85 × 100 × 20 mm, and they were moved as indicated in FIG. 2 (interconnected only by means of the packing material 13) through a microwave field, applied in the direction 1–2, with a speed of about 6 cm/sec. The frequency used was 2450 Mc/sec. The zone wherein the field was applied was charged and filled with water, the dielectric constant of which is about 50 percent greater than that of the product to be treated. The water was supplied at the left and discharged from the zone at the right, with reference to FIG. 2, and thus moved in the zone in the same direction as the product unit. The latter, where it was introduced into the zone was preheated to a temperature which was about the same throughout, namely, 69.4° ± 0.1°C. The water, where it was supplied to the zone, was preheated to a temperature of 65° C. The height of the zone, which was defined by 15 mm thick sheets of polysulphon, was adjusted to 25 mm. The product was introduced and transported in a symmetrical position in relation to these sheets as well as to the field-applying means. The space in the zone at each side of the passing portions was filled with water to a width S (FIG. 3) of 40 mm. The space tapered somewhat outward and was defined by a means of the kind shown at 22 in FIG. 4. The microwave treatment lasted for about 1 minute, whereby the water as well as the product portions were heated. At nine points regularly distributed along a diagonal from corner to corner through a product portion, the following temperatures were obtained where the product unit left the zone: 133.9°; 137.3°; 135.2°; 133.3°; 133.1°; 133.3°; 135.2°; 137.3°; 133.9° C. In the surface layer of the product unit, exclusive of its corners, a temperature of 135.1° = 0.3° C. was obtained. The water, where it left the zone in which the microwaves were applied, had a temperature of 133° C., that is, about the same temperature as that obtained in the product corners and surface layer.

As about the same temperature was achieved in the interior of the product unit as along the diagonal, and all temperatures well exceeded the desired 130° C., the choice of medium (water at 65° C.) in combination with the microwave treatment led to the desired result.

I claim:

1. In the electro-magnetic heating of separate units of a product to a predetermined temperature substantially above water's freezing point in an electro-magnetic field of at least microwave frequency applied in a main direction against said unit, the method which comprises closely surrounding each said unit in said field by a medium which, at least along the boundaries of said unit as seen in a plane perpendicular to said main direction, has a dielectric constant which is at least one-half the dielectric constant of the product unit in said field, terminating said electro-magnetic heating of each product unit when the interior of the unit is at substantially said predetermined temperature, and cooling the surface portion of each product unit during the electro-magnetic heating thereof by controlling the temperature of said surrounding medium to provide said product unit with a temperature at the surface portion thereof which, upon said termination, is substantially said predetermined temperature.

2. The method of claim 1, in which said medium closely surrounds said casing of the product unit.

3. The method of claim 1, in which said medium is a fluid.

4. The method of claim 1, in which said heating is effected by moving the product unit into a zone containing the electro-magnetic field and is terminated by moving said unit out of said field, the temperature of said medium being controlled to give it substantially said predetermined temperature at the location where the product unit leaves said field in said zone.

5. The method of claim 4, wherein said medium is a fluid which absorbs electro-magnetic energy and which moves through said zone in the same direction as the product unit, said temperature control being effected by heating said fluid electro-magnetically from an initial temperature at its entrance to said field to substantially said predetermined temperature at said location where the product unit leaves said field.

6. The method of claim 4, which comprises also adjusting the height of said zone, as reckoned in said main direction, to give said zone a height exceeding the height but not substantially greater than of said product unit.

7. The method of claim 6, in which said height adjustment is effected by substituting sheets of different thickness which partly define said zone, said sheets being of dielectric material which only slightly absorbs the electro-magnetic field.

8. The method of claim 1, wherein said surrounding medium has a dielectric constant which decreases with increasing temperature.

9. The method of claim 1, comprising also enclosing each product unit, before said electro-magnetic heating thereof, in a casing transparent to microwaves.

10. The method of claim 1, in which said medium is an aqueous medium.

11. In the electro-magnetic heating of separate units of a product to a predetermined temperature in an electro-magnetic field of at least microwave frequency applied in a main direction against said unit, the method which comprises closely surrounding each said unit in said field by a medium which, at least along the boundaries of said unit as seen in a plane perpendicular to said main direction, has a dielectric constant which is at least one-half the dielectric constant of the product unit in said field, terminating said electro-magnetic heating of each product unit when the interior of the unit is at substantialy said predetermined temperature, and cooling the surface portion of each product unit during the electro-magnetic heating thereof by controlling the temperature of said surrounding medium to provide said product unit with a temperature at the surface portion thereof which, upon said termination, is substantially said predetermined temperature, said heating being effected by moving the product unit into a zone containing the electromagnetic field and being terminated by moving said unit out of said field, the temperature of said medium being controlled to give it substantially said predetermined temperature at the location where the product unit leaves said field in said zone, said zone at each side of the product unit passing therethrough being filled with a medium to a width at least equal to the height of the product unit, said filling medium having a dielectric constant which is at least one-half of the dielectric constant of the product unit in said field.

12. The method of claim 11, in which said width does not exceed three times said height of the product unit, said filling medium being a fluid which absorbs the electromagnetic field to a substantial degree.

13. The method of claim 11, in which said filling medium is the same as said medium which closely surrounds said unit.

14. The method of claim 11, in which said filling medium includes solid bodies.

15. In the electro-magnetic heating of separate units of a product to a predetermined temperature in an electro-magnetic field of at least microwave frequency applied in a main direction against said unit, the method which comprises closely surrounding each said unit in said field by a medium which, at least along the boundaries of said unit as seen in a plane perpendicular to said main direction, has a dielectric constant which is at least one-half the dielectric constant of the product unit in said field, terminating said electro-magnetic heating of each product unit when the interior of the unit is at substantially said predetermined temperature, and cooling the surface portion of each product unit during the electro-magnetic heating thereof by controlling the temperature of said surrounding medium to provide said product unit with a temperature at the surface portion thereof which, upon said termination, is substantially said predetermined temperature, said heating being effected by moving the product unit into a zone containing the electromagnetic field and being terminated by moving said unit out of said field, the temperature of said medium being controlled to give it substantially said predetermined temperature at the location where the product unit leaves said field in said zone, the method comprising also adjusting the height of said zone, as reckoned in said main direction, to give said zone a height exceeding but not substantially greater than the height of said product unit, said height adjustment being effected by adjusting a membrane partly defining said zone, said membrane being adjusted by varying the pressure of a control fluid on the side of the membrane which is remote from the product unit passing through said zone, said control fluid being a medium which only slightly absorbs the electromagnetic field.

* * * * *